United States Patent Office 2,779,683
Patented Jan. 29, 1957

2,779,683

METHODS OF MAKING LIGNOCELLULOSE PRODUCTS, AND THE PRODUCTS RESULTING THEREFROM

Harvey J. Gill, Jr., Dubuque, Iowa, assignor to Carr, Adams & Collier Company, a corporation of Iowa No Drawing. Application October 9, 1953,
Serial No. 385,279

13 Claims. (Cl. 106—163)

This invention relates to methods of making a lignocellulose product and the products resulting therefrom.

It is the general object of this invention to provide methods of making a molded lignocellulose product comprising intimately mixing a finely-divided lignocellulose material of relatively low moisture content with dibasic ammonium phosphate and applying pressure to the mixture while heating at an elevated temperature for a time sufficient to combine chemically at least a portion of the phosphate and the lignocellulose.

Another object of the invention is to provide such a method wherein lignin is added to form a part of the mixture prior to the heating step.

A more specific object of the invention is to provide methods wherein the phosphate is present in an amount of about 2–4% by weight of the lignocellulose, the lignin is present in an amount of between 4–8% by weight of the lignocellulose and the mixture is heated to about 450–500° F. at about 50–100 pounds per square inch pressure for about 20–40 minutes.

A further object of the invention is to provide a molded lignocellulose product comprising the reaction product of lignocellulose and dibasic ammonium phosphate.

Other objects will become readily apparent from the following detailed description of the invention.

In general, the methods of this invention involve mixing finely-divided lignocellulose and a small amount of dibasic ammonium phosphate. The materials are mixed to form a substantially homogeneous mixture which is then heated preferably while being molded to combine chemically at least a portion of the phosphate with the lignocellulose and to form a molded product. The resulting product is a reaction product between the lignocellulose and at least a portion of the dibasic ammonium phosphate.

In the preferred process lignin is also added to the mixture prior to the compressing and heating as the product so produced is superior in physical properties to the product produced with either lignocellulose and lignin alone or lignocellulose and dibasic ammonium phosphate alone.

It has long been known that lignocellulose particles such as finely-divided wood can be compressed into a solid mass by heat and pressure as the heat apparently causes the lignin to become plastic and serve as a binder. The temperatures that have been required in this process, however, are so high that rapid and almost spontaneous decomposition of the lignocellulose results. Therefore, this method has not been practical.

By the methods of this invention where dibasic ammonium phosphate is used intimately mixed with the lignocellulose such decomposition is largely, although not completely avoided so that molded articles can be produced in a single-step process. The reason for this appears to be that the dibasic ammonium phosphate gives an alkaline reaction at first to prevent hydrolysis decomposition of the lignocellulose until the mixture has been heated to a substantially uniform temperature throughout and then the phosphate becomes acid on further heating to react with the lignocellulose and produce a strong molded product without the production of excessive fumes and gases.

Although the above process of using dibasic ammonium phosphate produces an excellent product, the product can be even further improved by using a small portion of added lignin with the dibasic ammonium phosphate. The phosphate and lignin combination appears to produce a synergistic effect that is greater than the additive effects of the phosphate and lignin.

The lignocellulose that is used is relatively dry and preferably does not contain over 30% water by weight of the dry lignocellulose, which is approximately the fiber saturation point. A preferred moisture content of 6–10% appears to result in superior final products.

During the process various chemical reactions take place and these are not thoroughly understood. It appears, however, that the dibasic ammonium phosphate which is alkaline at first, neutralizes acid decomposition products of the lignocellulose and thus prevents them from attacking and too rapidly decomposing the remainder of the lignocellulose. However, after a suitable temperature has been reached the phosphate gives an acid reaction to promote hydrolysis of the lignocellulose and separation of the lignin which appears to act as a binder.

The lignocellulose that may be used in this invention includes wood and other lignocellulose vegetable materials including partially hydrolyzed or pulped lignocellulose. The lignocellulose material is finely divided with the particles preferably being not coarser than about 20 mesh in size although particles passing through a 50 mesh screen produce a smoother, stronger and finer grained final product.

In practicing the methods of this invention the dibasic ammonium phosphate is preferably used in an amount between 2 and 4% by weight of the lignocellulose. Where lignin is employed this lignin is preferably present in an amount between about 4 and 8% by weight of lignocellulose. The molding pressure may be any desired pressure but is preferably about 50 to 100 pounds per square inch. The temperature is sufficiently high to produce a chemical reaction between the phosphate and the lignocellulose and is preferably between about 450–500° F. although reaction will occur at lower temperatures such as 400° F. if the time is correspondingly increased. The molding time will depend entirely upon the type of product being produced but, in general, will vary between about 20 and 40 minutes. These conditions are applicable whether lignin is or is not present.

The lignin that is used may be produced by any of the ordinary methods such as by the hydrolysis of wood or by similar digestive processes. One type of lignin that has been used in this process is that indicated by the name "Indulin A."

In an example of practicing the processes of this invention, 50 mesh ponderosa pine sawdust with a moisture content of 6% was mixed with 5.4% by weight of the sawdust of lignin and 1.7% by weight of dibasic ammonium phosphate. This mixture was compressed and heated at a pressure of about 55 pounds per square inch and a temperature of about 475° F. for about 35 minutes. The heating and pressing took place between the platens of a heated press and the process produced a substantially uniform board.

During the process of this invention the dibasic ammonium phosphate which has an amphoteric character during temperature changes, first gave off a volatile basic constituent which was essentially ammonia. This alkaline vapor apparently neutralized any acidic elements present or produced in the mixture so as to reduce losses due to hydrolysis. The phosphate thereupon became acidic and the phosphate appears to be primarily orthophosphoric acid. After a period of relative inactivity with increasing temperature, the orthophosphoric acid then appears to decompose to pyrophosphoric acid. It appears that at this time polymerization of the mass occurs, catalyzed by the pyrophosphoric acid. The end product of this reaction appears to be a water insoluble phosphate.

Although the above appears to be the mechanics of the reaction, this is somewhat theoretical, although the elimination of ammonia in the formation of the phosphoric acids has been shown. Thus, the ammonia appears to be given off over a range of 248 to 338° F., leaving orthophosphoric acid. This acid does not excessively break down cellulose such as will occur in the presence of a strong mineral acid. The degradation of the cellulose, therefore, is relatively slight, particularly while the ammonia is being given off. At about 414° F. the orthophosphoric acid appears to decompose to the pyrophosphoric acid. During all these changes the mixture of sawdust, lignin and dibasic ammonium phosphate initially has a slightly acid pH. Upon heating the mixture becomes basic due to the evolution of the ammonia. During this period the acid ingredients of the mixture appear to be neutralized by the ammonia. Upon further heating after the evolution of the ammonia, the mixture shows an acid pH and this is maintained throughout the course of the reaction.

While the invention has been disclosed and described herein in a particular embodiment and in detail, it is not intended that the invention be limited to the specific disclosures made. On the contrary, it is intended to cover all modifications and alternative constructions falling within the spirit and scope of the invention as defined in the appended claims.

I claim:

1. The method of making a lignocellulose product, comprising: intimately mixing a finely divided lignocellulose material with dibasic ammonium phosphate; and heating said mixture at a temperature of at least 400° F. for at least 20 minutes.

2. The method of claim 1 wherein the phosphate is present in an amount of about 1.7–4% by weight of the lignocellulose.

3. The method of claim 1 wherein said temperature is about 400–500° F.

4. The method of making a lignocellulose product, comprising: intimately mixing a finely divided lignocellulose material with dibasic ammonium phosphate; and heating said mixture at a temperature of at least 400° F. for between about 20–40 minutes.

5. The method of making a lignocellulose product, comprising: intimately mixing a finely divided lignocellulose material with dibasic ammonium phosphate and lignin; and heating said mixture at a temperature of at least 400° F. for at least 20 minutes.

6. The method of claim 3 wherein the lignin is present in an amount of about 4–8% by weight of the lignocellulose.

7. The method of claim 5 wherein the phosphate is present in an amount of about 1.7–4% by weight of the lignocellulose.

8. The method of making a lignocellulose product, comprising: intimately mixing a finely divided lignocellulose material with dibasic ammonium phosphate and lignin; and heating said mixture at a temperature of at least 400° F. for at least 20 minutes while compressing the mixture at a pressure of at least about 50 pounds per square inch.

9. The method of making a lignocellulose product, comprising: intimately mixing a finely divided lignocellulose material with dibasic ammonium phosphate and lignin; and heating said mixture at a temperature of at least 400° F. for between about 20–40 minutes.

10. A lignocellulose product made by the method of claim 1.

11. A lignocellulose product made by the method of claim 4.

12. A lignocellulose product made by the method of claim 5.

13. A lignocellulose product made by the method of claim 9.

References Cited in the file of this patent

UNITED STATES PATENTS

| | | |
|---|---|---|
| 2,033,411 | Carson | Mar. 10, 1936 |
| 2,392,163 | Lewis | Jan. 1, 1946 |
| 2,542,025 | Goss | Feb. 20, 1951 |
| 2,581,652 | Goss | Jan. 8, 1952 |